(12) United States Patent
Wang

(10) Patent No.: US 11,577,402 B2
(45) Date of Patent: Feb. 14, 2023

(54) ROBOT SYSTEM AND PORTABLE TEACHING DEVICE

(71) Applicant: Seiko Epson Corporation, Tokyo (JP)

(72) Inventor: Lei Wang, Matsumoto (JP)

(73) Assignee: SEIKO EPSON CORPORATION

( * ) Notice: Subject to any disclaimer, the term of this patent is extended or adjusted under 35 U.S.C. 154(b) by 253 days.

(21) Appl. No.: 16/887,028

(22) Filed: May 29, 2020

(65) Prior Publication Data

US 2020/0376680 A1 Dec. 3, 2020

(30) Foreign Application Priority Data

May 30, 2019 (JP) .............................. JP2019-101037

(51) Int. Cl.
| | |
|---|---|
| *B25J 13/08* | (2006.01) |
| *B25J 9/16* | (2006.01) |
| *B25J 13/00* | (2006.01) |
| *G05D 1/02* | (2020.01) |
| *G02B 27/01* | (2006.01) |
| *H04L 67/12* | (2022.01) |

(52) U.S. Cl.
CPC .............. *B25J 13/08* (2013.01); *B25J 9/162* (2013.01); *B25J 13/006* (2013.01); *G02B 27/0172* (2013.01); *G05D 1/027* (2013.01); *G05D 1/0234* (2013.01); *H04L 67/12* (2013.01)

(58) Field of Classification Search
CPC . B25J 13/08; B25J 13/006; B25J 9/162; B25J 5/007; B25J 9/0084; B25J 13/06; B25J 9/0081; B25J 9/1664; B25J 13/087; B25J 19/00; G02B 27/0172; G05D 1/0234; G05D 1/027; H04L 67/12
See application file for complete search history.

(56) References Cited

U.S. PATENT DOCUMENTS

| | | | |
|---|---|---|---|
| 2016/0158937 A1* | 6/2016 | Kamoi | ................... B25J 9/1671 901/5 |
| 2016/0379482 A1 | 12/2016 | Saito et al. | |

(Continued)

FOREIGN PATENT DOCUMENTS

| | | |
|---|---|---|
| JP | 2007-031466 A | 2/2007 |
| JP | 2008-080474 A | 4/2008 |

(Continued)

OTHER PUBLICATIONS

Kim et al "Wireless Teaching Pendant for Mobile Welding Robot in Shipyard", 2008, IFAC.*

*Primary Examiner* — Rachid Bendidi
(74) *Attorney, Agent, or Firm* — Harness, Dickey & Pierce, P.L.C.

(57) ABSTRACT

A robot system includes a mobile robot configured to move, a portable teaching device including a display section configured to display information, the portable teaching device teaching the mobile robot, a first detecting section configured to detect a present position of the portable teaching device, a second detecting section configured to detect a present position of the mobile robot, and a display control section configured to cause, based on a detection result of the first detecting section and a detection result of the second detecting section, the display section to display the present position of the portable teaching device and the present position of the mobile robot.

18 Claims, 13 Drawing Sheets

(56) References Cited

U.S. PATENT DOCUMENTS

| | | | |
|---|---|---|---|
| 2017/0197313 A1* | 7/2017 | Nishino | A61B 5/02055 |
| 2017/0201617 A1* | 7/2017 | So | H04Q 9/00 |
| 2017/0329347 A1* | 11/2017 | Passot | G05D 1/0246 |

FOREIGN PATENT DOCUMENTS

| | | |
|---|---|---|
| JP | 2008-197856 A | 8/2008 |
| WO | 2015/137135 A1 | 9/2015 |

\* cited by examiner

ROBOT SYSTEM AND PORTABLE TEACHING DEVICE

The present application is based on, and claims priority from JP Application Serial Number 2019-101037, filed May 30, 2019, the disclosure of which is hereby incorporated by reference herein in its entirety.

BACKGROUND

1. Technical Field

The present disclosure relates to a robot system and a portable teaching device.

2. Related Art

There has been proposed a system that couples one portable teaching device, a so-called teaching pendant, and a plurality of robots by wireless communication and operates the robots.

For example, JP-A-2008-197856 (Patent Literature 1) discloses a robot system including a plurality of robots, a controller that controls the robots, and a teaching device coupled to the controller by wireless communication. The robot system includes a teaching-device-position measuring section provided in the teaching device. The teaching-device-position measuring section calculates a position of the teaching device in a factor using a position identification system such as an indoor GPS (Global Positioning System) and displays the position of the teaching device on a display of the teaching device. On the other hand, a layout drawing of robots in the factory is displayed on the display. Consequently, both of the layout drawing of the robots and the position of the teaching device can be displayed on the display. Therefore, for example, when a user selects, using the teaching device, a robot that the user is about to operate, the user can intuitively select the robot.

Since the robots in the past are fixed to a floor or the like of the factory, a positional relation among the robots does not change. However, in recent years, mobile robots such as autonomous mobile robots have been developed. Since the positions of the autonomous mobile robots change every moment, a positional relation between a teaching device and the autonomous mobile robots always changes. As a result, when a user selects, using the teaching device, an autonomous mobile robot that the user is about to operate, the user is likely to select an autonomous mobile robot different from the autonomous mobile robot that the user should select.

SUMMARY

A robot system according to an application example of the present disclosure includes: a mobile robot configured to move; a portable teaching device including a display section configured to display information, the portable teaching device teaching the mobile robot; a first detecting section configured to detect a present position of the portable teaching device; a second detecting section configured to detect a present position of the mobile robot; and a display control section configured to cause, based on a detection result of the first detecting section and a detection result of the second detecting section, the display section to display the present position of the portable teaching device and the present position of the mobile robot.

DESCRIPTION OF EXEMPLARY EMBODIMENTS

Preferred embodiments of the present disclosure are explained in detail below with reference to the accompanying drawings.

1. First Embodiment

Figure 1:
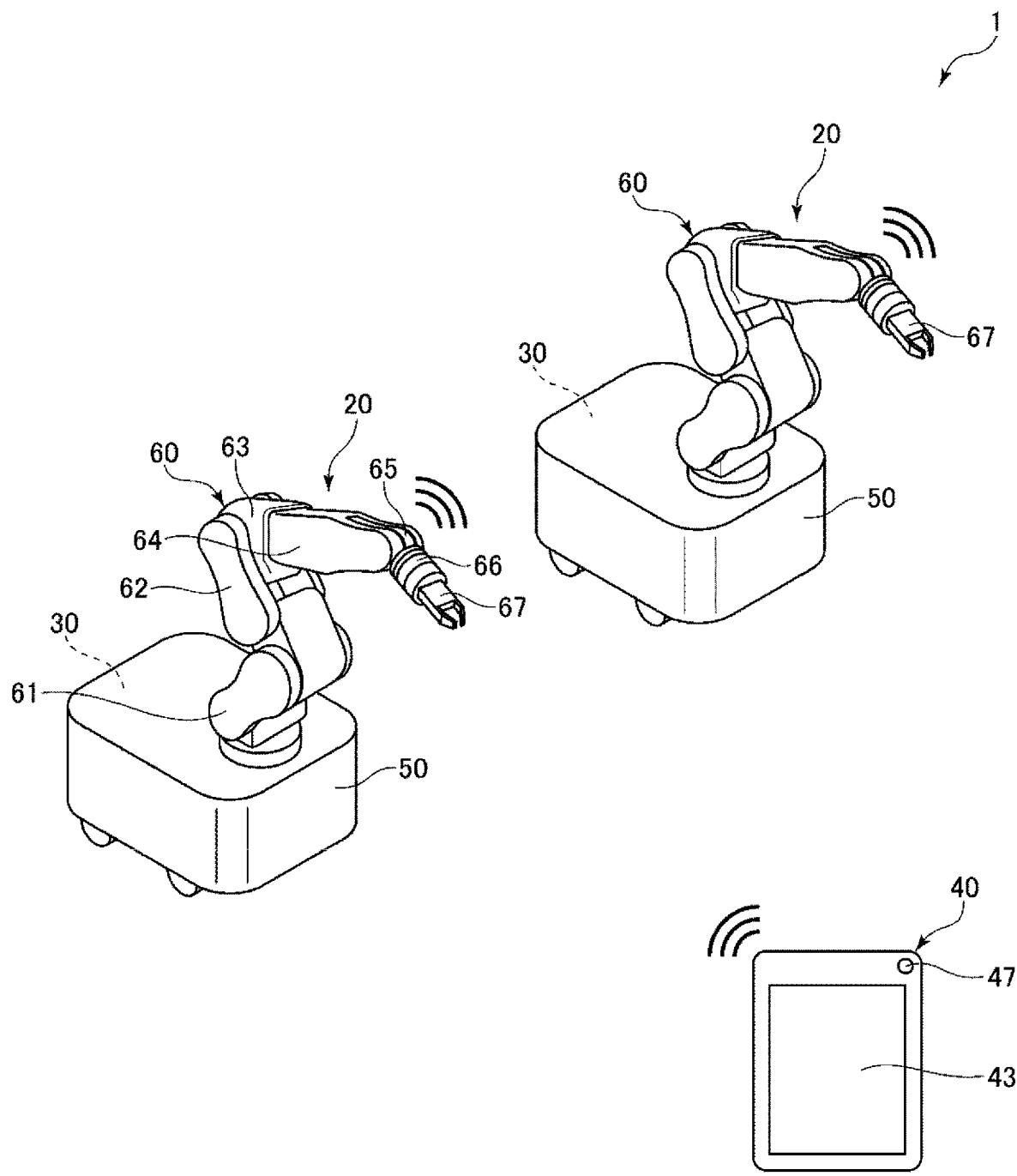
FIG. 1 is a diagram schematically showing a robot system according to a first embodiment.
Figure 2:
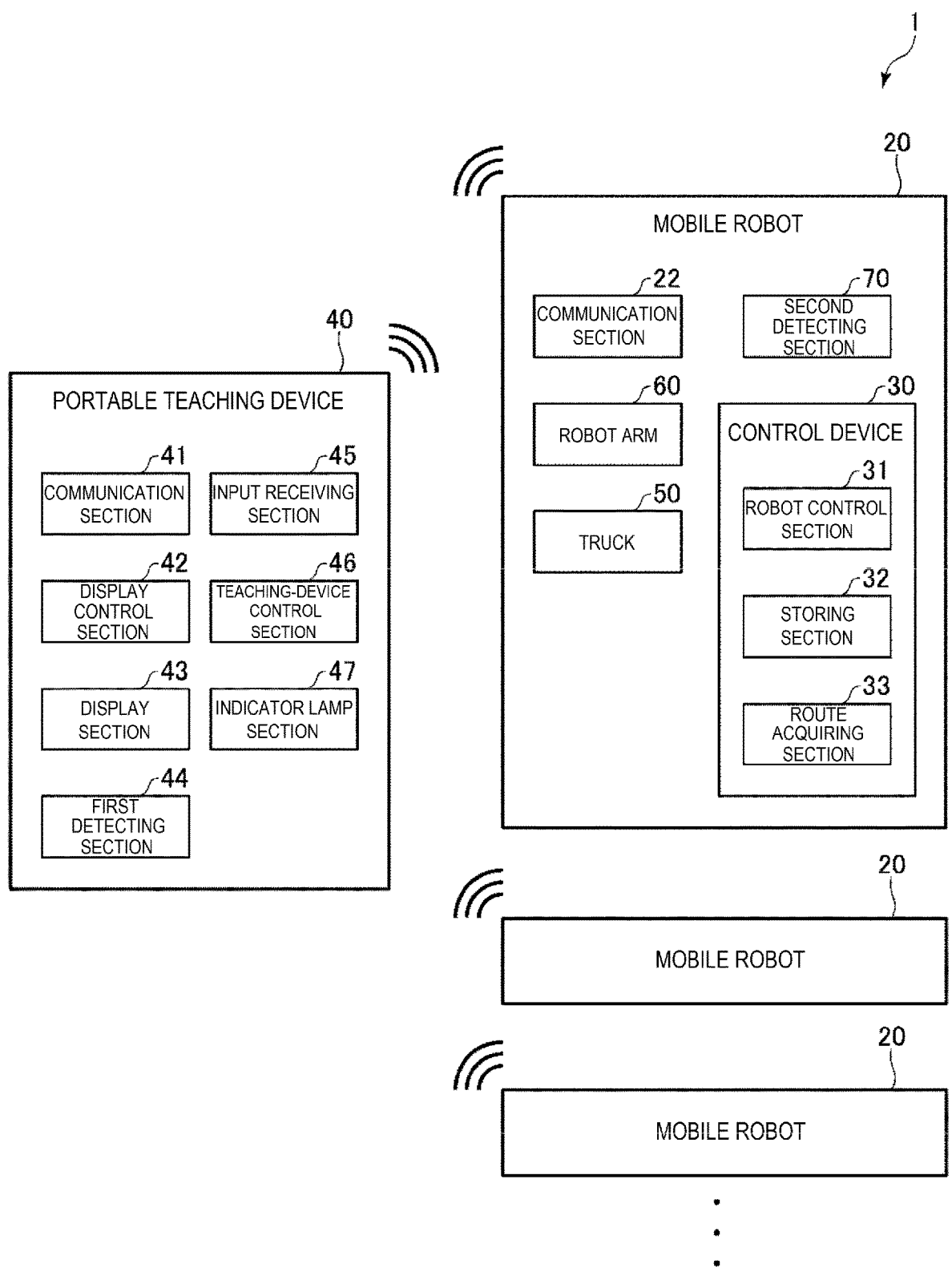
FIG. 2 is a functional block diagram of the robot system shown in FIG. 2.

FIG. 1 is a diagram schematically showing a robot system according to a first embodiment. FIG. 2 is a functional block diagram of the robot system shown in FIG. 1.

A robot system 1 shown in FIG. 1 includes mobile robots 20, control devices 30, and a portable teaching device 40.

The mobile robots 20 include movable trucks 50 and robot arms 60 mounted on the trucks 50. The control devices 30 may be separate from the mobile robots 20. However, in this embodiment, the control devices 30 are housed on the insides of the trucks 50. Consequently, the control devices 30 are configured to move together with the mobile robots 20.

The robot system 1 may include one mobile robot 20. However, in FIG. 1, the robot system 1 includes a plurality of mobile robots 20.

The portable teaching device 40 is a device that teaches the mobile robots 20. The portable teaching device 40 has portability for enabling the portable teaching device 40 to move even in a state in which a user holds the portable teaching device 40. The portable teaching device 40 and the mobile robots 20 are coupled by wireless communication in the figures but may be coupled by wired communication.

1.1 Portable Teaching Device

The portable teaching device 40 shown in FIG. 2 includes a communication section 41, a display control section 42, a display section 43, a first detecting section 44, an input receiving section 45, a teaching-device control section 46, and an indicator lamp section 47.

The communication section 41 includes a transceiver configured to couple the portable teaching device 40 and the mobile robots 20 by wireless communication or wired communication.

The display control section 42 causes, based on a detection result by the first detecting section 44 and a detection result by a second detecting section 70 included in the mobile robot 20 explained below, the display section 43 to display a present position of the portable teaching device and a present position of the mobile robot 20. When communication between the communication section 41 and a specific mobile robot 20 is established, the display control section 42 differentiates display of the mobile robot 20 from display of the other mobile robots 20 to thereby visually display a communication state.

The display section 43 displays, based on a signal from the display control section 42, the present position of the portable teaching device 40 and the present position of the mobile robot 20. Examples of the display section 43 include a liquid crystal display device and an organic EL (Electro Luminescence) display device. The display by the display section 43 may be two-dimensional display or may be three-dimensional display. In the case of the three-dimensional display, there is an advantage that it is easy to cause the user to recognize a position in a depth direction.

The first detecting section 44 detects the position of the portable teaching device 40 in a space in which the mobile robot 20 is located. For the detection of the position, a publicly-known positioning technique for detecting a position indoors is used. Examples of the publicly-known positioning technique include a positioning technique by a wireless LAN (Local Area Network), a positioning technique by an RFID (Radio Frequency Identifier), a positioning technique by an SLAM (Simultaneous Localization and Mapping) for simultaneously performing estimation of a position and creation of a map, a positioning technique by an IMES (Indoor Messaging System), a positioning technique by pedestrian dead reckoning, a beacon positioning technique, a positioning technique by image recognition, and a positioning technique by ultrasound. Two or more kinds of these positioning techniques may be combined to achieve high accuracy. Further, high accuracy of the positioning technique may be achieved using a technique of distance measurement or direction detection by visible light or terrestrial magnetism.

The first detecting section 44 may be provided in the portable teaching device 40. However, the first detecting section 44 may be provided on the outside of the portable teaching device 40 if the first detecting section 44 is capable of detecting the position of the portable teaching device 40.

As explained above, for the first detecting section 44, the positioning techniques of various schemes can be adopted. However, in this embodiment, as an example, a positioning technique obtained by combining a technique for measuring the position of the portable teaching device 40 with respect to an outside environment and a technique for detecting a marker present in the outside environment is adopted.

Figure 3:
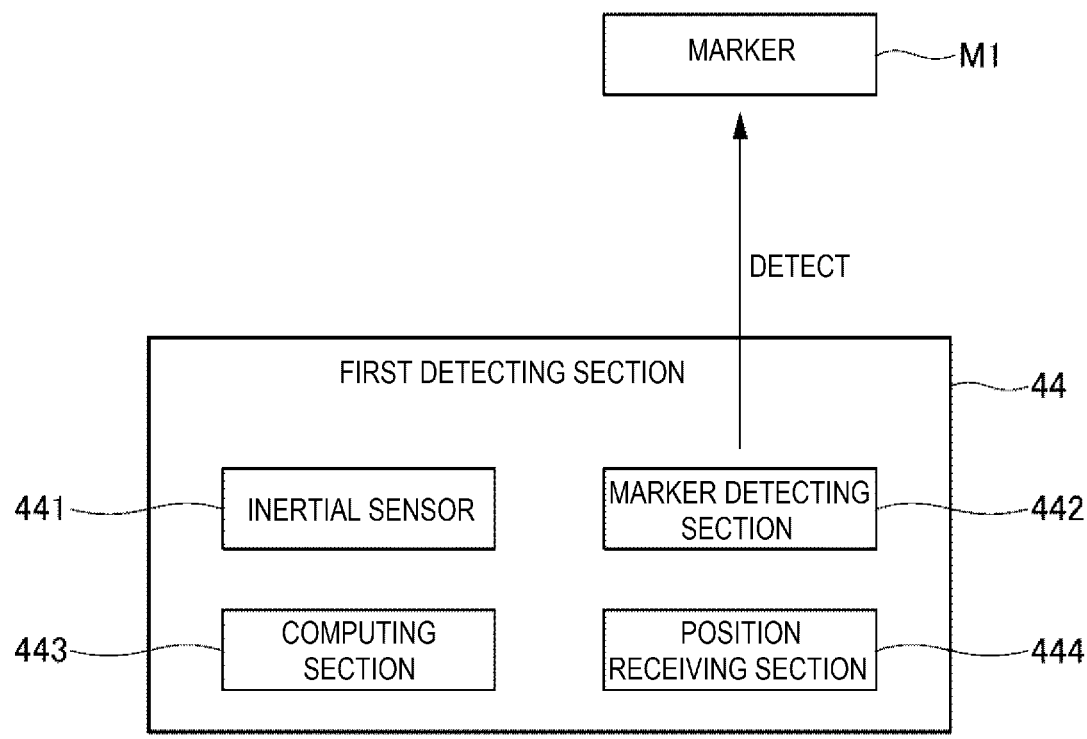
FIG. 3 is a functional block diagram schematically showing the configuration of a first detecting section shown in FIG. 2.

FIG. 3 is a functional block diagram schematically showing the configuration of the first detecting section 44 shown in FIG. 2.

As shown in FIG. 3, in this embodiment, a marker M1 is provided in a known position. The marker M1 is provided in an outdoor environment with respect to the portable teaching device 40 including the first detecting section 44. The first detecting section 44 shown in FIG. 3 includes an inertial sensor 441 configured to measure a motion state of the portable teaching device 40, a marker detecting section 442 capable of detecting the marker M1, a computing section 443 configured to calculate a present position of the portable teaching device 40 based on a detection result of the inertial sensor 441 and a detection result of the marker detecting section 442, and a position receiving section 444 configured to receive a present position of the mobile robot 20 explained below from a position transmitting section 74. The position receiving section 444 may be integrated with the communication section 41.

An inertial sensor 71 is, for example, a sensor obtained by combining an acceleration sensor and an angular velocity sensor. A moving direction and a movement amount can be estimated by integrating a detection result of the inertial sensor 71, that is, relative motion information. Such an estimation technique is called dead reckoning as well. If the moving direction and the movement amount can be estimated by the dead reckoning, a present position can be estimated. On the other hand, there is a problem of accumulating errors.

Therefore, the first detecting section 44 includes the marker detecting section 442. The marker detecting section 442 detects the marker M1 before the accumulation of errors due to the dead reckoning exceeds an allowable range. Since the position of the marker M1 is known, the position of the portable teaching device 40 with respect to the outside environment can be calibrated by detecting the marker M1. In other words, a reference position of the portable teaching device 40 is calculated according to a detection result of the marker detecting section 442 to eliminate the errors of the dead reckoning.

Examples of a detection method for the marker M1 by a marker detecting section 72 include detection by vision for detecting the marker M1 using a camera. A distance and a direction from the portable teaching device 40 to the marker M1 can be calculated based on an image captured by the camera. The detection by vision can be substituted by, for example, a method by ultrasound or a distance measuring method by laser.

The present position of the portable teaching device 40 calculated by the computing section 443 included in the first detecting section 44 of the portable teaching device 40 is used when the present position is displayed on the display section 43 by the display control section 42 as explained below.

The input receiving section 45 receives input operation such as selection operation by the user based on content displayed on the display section 43. A signal of the input operation received by the input receiving section 45 is output to the teaching-device control section 46. Examples of the input receiving section 45 include a touch panel, a slide pad, a keypad, and a keyboard. The touch panel is desirably provided over a display surface of the display section 43.

The teaching-device control section 46 selects one mobile robot 20 based on the input operation received by the input receiving section 45 and causes the communication section 41 to establish communication with the mobile robot 20. The teaching-device control section 46 outputs various operation signals to the mobile robot 20 with which the communication is established. Consequently, the teaching-device control section 46 performs teaching work on the mobile robot 20. The teaching-device control section 46 changes a lighting pattern of the indicator lamp section 47 according to a communication state in the communication section 41.

The indicator lamp section 47 is configured by, for example, an LED (Light Emitting Diode) lamp. The indicator lamp section 47 represents, for example, a communication state between the communication section 41 and the mobile robot 20 with a lighting pattern. Consequently, it is possible to cause the user to more intuitively recognize the communication state. As the LED lamp, a lamp capable of independently lighting lights of a plurality of colors may be used. Consequently, it is also possible to represent a communication state according to a lighting color.

Any other equipment or the like may be provided in the portable teaching device 40.

1.2 Mobile Robot

The mobile robot 20 shown in FIG. 2 includes the truck 50, the robot arm 60, a communication section 22, and a second detecting section 70.

The robot arm 60 shown in FIG. 1 is a so-called six-axis vertical articulated robot arm. The robot arm 60 includes an arm 61, an arm 62, an arm 63, an arm 64, an arm 65, and an arm 66. These arms 61 to 66 are coupled in this order from the proximal end side toward the distal end side of the robot arm 60. The arms 61 to 66 are capable of turning with respect to arms adjacent thereto or the truck 50.

As shown in FIG. 1, a gripping hand 67 that grips a work target object is coupled to the distal end of the robot arm 60. The gripping hand 67 is replaceable. A suction hand, a magnetic hand, a screwing tool, an engaging tool, or the like may be used instead of the gripping hand 67.

The mobile robot 20 includes driving sections including not-shown motors configured to turn one arm with respect to the other arm or the truck 50 and not-shown speed reducers. The mobile robot 20 includes a not-shown position sensor configured to detect rotation angles of rotation axes of the motors or the speed reducers. The driving sections and the position sensors are provided in, for example, the truck 50 and the arms 61 to 66 and enable the arms to be driven independently from one another. The driving sections and the position sensors are respectively communicably coupled to the control device 30.

The number of arms of the robot arm 60 may be one to five or may be seven or more. The mobile robot 20 may be a SCARA robot or may be a double-arm robot including two or more robot arms 60.

The truck 50 is not particularly limited if the truck 50 is a truck configured to move to a target position. Examples of the truck 50 include an AMR (Autonomous Mobile Robot) and an AGV (Automated Guided Vehicle). The control device 30 executes a work program to thereby output a driving control signal to the truck 50. Driving of the truck 50 is controlled based on the driving control signal. The truck 50 moves to the target position.

The movement may be automatic guide for guiding the truck 50 to a destination along a guide such as a magnetic tape or a magnetic bar. However, the mobile robot 20 according to this embodiment is an autonomously movable robot that reads a peripheral situation and autonomously moves to a destination. That is, the mobile robot 20 according to this embodiment is an autonomous mobile robot. Such an autonomous mobile robot can move to a destination without requiring a guide for guidance. Accordingly, it is possible to easily change the destination according to work content. Setting of the autonomous mobile robot is easy and setting cost is relatively low.

Autonomous movement of the mobile robot 20 according to this embodiment is realized by a publicly-known autonomous movement system included in the truck 50. The autonomous movement system included in the truck 50 may be integrated with the control device 30. The truck 50 is desirably a truck that moves with power but may be a truck that is manually moved.

The communication section 22 includes a transceiver configured to couple the mobile robot 20 and the portable teaching device 40 by wireless communication. A communication scheme of the wireless communication between the mobile robot 20 and the portable teaching device 40 may be an infrastructure mode or may be an ad-hoc mode.

The mobile robot 20 and the portable teaching device 40 may be coupled by wired communication. However, in this embodiment, the mobile robot 20 and the portable teaching device 40 are coupled by wireless communication. Consequently, since there is no limitation of movement involved in wiring, mobility of the mobile robot 20 is improved and work efficiency can be improved. Similarly, portability of the portable teaching device 40 is further improved.

The second detecting section 70 detects the position of the mobile robot 20 in a space in which the mobile robot 20 is located. For the detection of the position, as in the first detecting section 44, a publicly-known positioning technique for detecting a position indoors is used. Examples of the publicly-known positioning technique include a positioning technique by a wireless LAN, a positioning technique by an RFID, a positioning technique by an IMES, a positioning technique by an SLAM, a positioning technique by pedestrian dead reckoning, a beacon positioning technique, a positioning technique by image recognition, and a positioning technique by ultrasound. Two or more kinds of these positioning techniques may be combined to achieve high accuracy. Further, high accuracy of the positioning technique may be achieved using a technique of distance measurement or direction detection by visible light or terrestrial magnetism.

For the second detecting section 70, as explained above, the positioning techniques of various schemes can be adopted. However, in this embodiment, as an example, a positioning technique obtained by combining a technique for measuring the position and the posture of the mobile robot 20 with respect to an outside environment and a technique for detecting a marker present in the outside environment is adopted.

Figure 4:
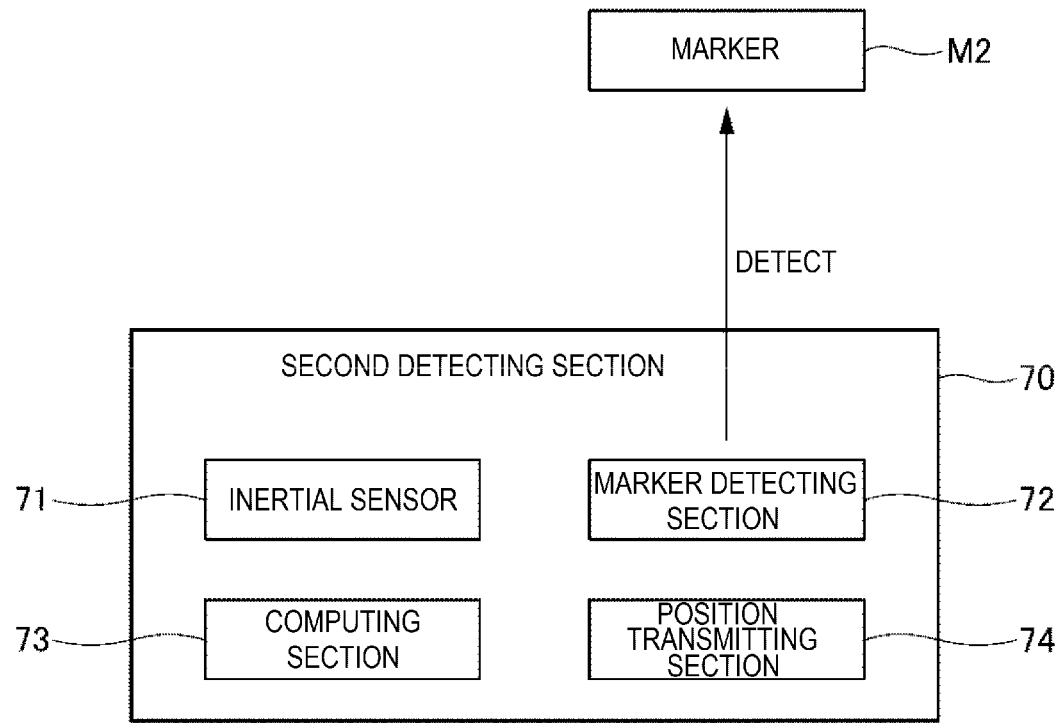
FIG. 4 is a functional block diagram schematically showing the configuration of a second detecting section shown in FIG. 2.

FIG. 4 is a functional block diagram schematically showing the configuration of the second detecting section 70 shown in FIG. 2.

As shown in FIG. 4, in this embodiment, a marker M2 is provided in a known position. The marker M2 is provided in an outside environment with respect to the mobile robot 20 including the second detecting section 70. The second detecting section 70 shown in FIG. 4 includes the inertial sensor 71 configured to measure a motion state of the mobile robot 20, the marker detecting section 72 capable of detecting the marker M2, a computing section 73 configured to calculate a present position of the mobile robot 20 based on a detection result of the inertial sensor 71 and a detection result of the marker detecting section 72, and the position transmitting section 74 configured to transmit the calculated present position of the mobile robot 20 to the position receiving section 444 of the portable teaching device 40. For communication from the position transmitting section 74 to the position receiving section 444, a publicly-known wireless communication technique can be used.

The inertial sensor 71 is, for example, a sensor obtained by combining an acceleration sensor and an angular velocity sensor. A moving direction and a movement amount can be estimated by integrating a detection result of the inertial sensor 71, that is, relative motion information. Such an estimation technique is called dead reckoning as well. If the moving direction and the movement amount can be estimated by the dead reckoning, a present position can be estimated. On the other hand, there is a problem of accumulating errors.

Therefore, the second detecting section 70 includes the marker detecting section 72. The marker detecting section 72 detects the marker M2 before the accumulation of errors due to the dead reckoning exceeds an allowable range. Since the position of the marker M2 is known, the position of the mobile robot 20 with respect to the outside environment can be calibrated by detecting the marker M2. In other words, a reference position of the mobile robot 20 is calculated according to a detection result of the marker detecting section 72 to eliminate the errors of the dead reckoning.

The inertial sensor 71 can be substituted by a sensor obtained by combining an angular velocity sensor and a sensor that detects a rotation amount of wheels of the truck 50.

Examples of a detection method for the marker M2 by the marker detecting section 72 include detection by vision for detecting the marker M1 using a camera. A distance and a direction from the mobile robot 20 to the marker M2 can be calculated based on an image captured by the camera. The detection by vision can be substituted by, for example, a method by ultrasound or a distance measuring method by laser.

As explained above, the second detecting section 70 includes the marker detecting section 72 provided in the mobile robot 20 and configured to detect the marker M2 disposed in the outside environment of the mobile robot 20, the inertial sensor 71 provided in the mobile robot 20, and the computing section 73 including a function of detecting the marker M2 with the marker detecting section 72 to thereby calculate a reference position of the mobile robot 20 and a function of calculating, with the inertial sensor 71, a distance and a direction from the reference position to the present position of the mobile robot 20.

With such a second detecting section 70, it is possible to measure the present position of the mobile robot 20 even with a relatively simple configuration. Accordingly, it is possible to achieve a reduction in the cost and a reduction in the size of the second detecting section 70.

The computing section 73 may be integrated with the control device 30 explained below.

The position transmitting section 74 may be integrated with the communication section 22 or may be integrated with the control device 30.

The second detecting section 70 may be provided on the outside of the mobile robot 20. In that case, acquisition of individual identification and positioning of the mobile robot 20 only have to be enabled by measurement from the outside.

The marker M2 may be the same marker as the marker M1 or may be a marker different from the marker M1. The marker M2 is not limited to one and a plurality of markers M2 may be disposed.

In the example explained above, the present positions of the mobile robots 20 are directly transmitted from the position transmitting sections 74 included in the mobile robots 20 to the position receiving section 444 included in the portable teaching device 40. However, not only this, but, for example, the present positions of the mobile robots 20 may be transmitted to a relay device such as a server provided in the outside environment of the mobile robots 20 and the portable teaching device 40 and may be transmitted from the relay device to the portable teaching device 40. In this case, the relay device includes a communication section and the communication section is capable of communicating with the position receiving section 444 and the position transmitting section 74.

Further, the mobile robots 20 may confirm the positions thereof with imaging sensors such as cameras and reflect confirmation results on positioning results of the mobile robots 20.

Any other equipment or the like may be provided in the mobile robot 20. Specifically, examples of the equipment include an imaging section that images a work target object, the mobile robot 20, or the periphery of the mobile robot 20 and various sensors such as a force sensor that detects an external force applied to the robot arm 60.

When the robot system 1 includes a plurality of mobile robots 20, the configurations of the mobile robots 20 are the same as the configuration explained above. The mobile robots 20 have peculiar IDs (identification signs). In communication between the portable teaching device 40 and the mobile robots 20, it is possible to establish communication between a specific mobile robot 20 and the portable teaching device 40 by transmitting and receiving data to which the IDs are given.

1.3 Control Device

The control device 30 includes a robot control section 31, a storing section 32, and a route acquiring section 33.

The robot control section 31 reads out and executes a program stored in the storing section 32 to thereby control driving of the robot arm 60 and cause the robot arm 60 to perform work. Selection of a program is performed based on an operation signal from the portable teaching device 40.

The route acquiring section 33 has a function of acquiring a planned moving track of the truck 50. The moving track is determined based on the present position of the mobile robot 20 and the program stored in the storing section 32.

1.4 Hardware Configuration of the Robot System

Figure 5:
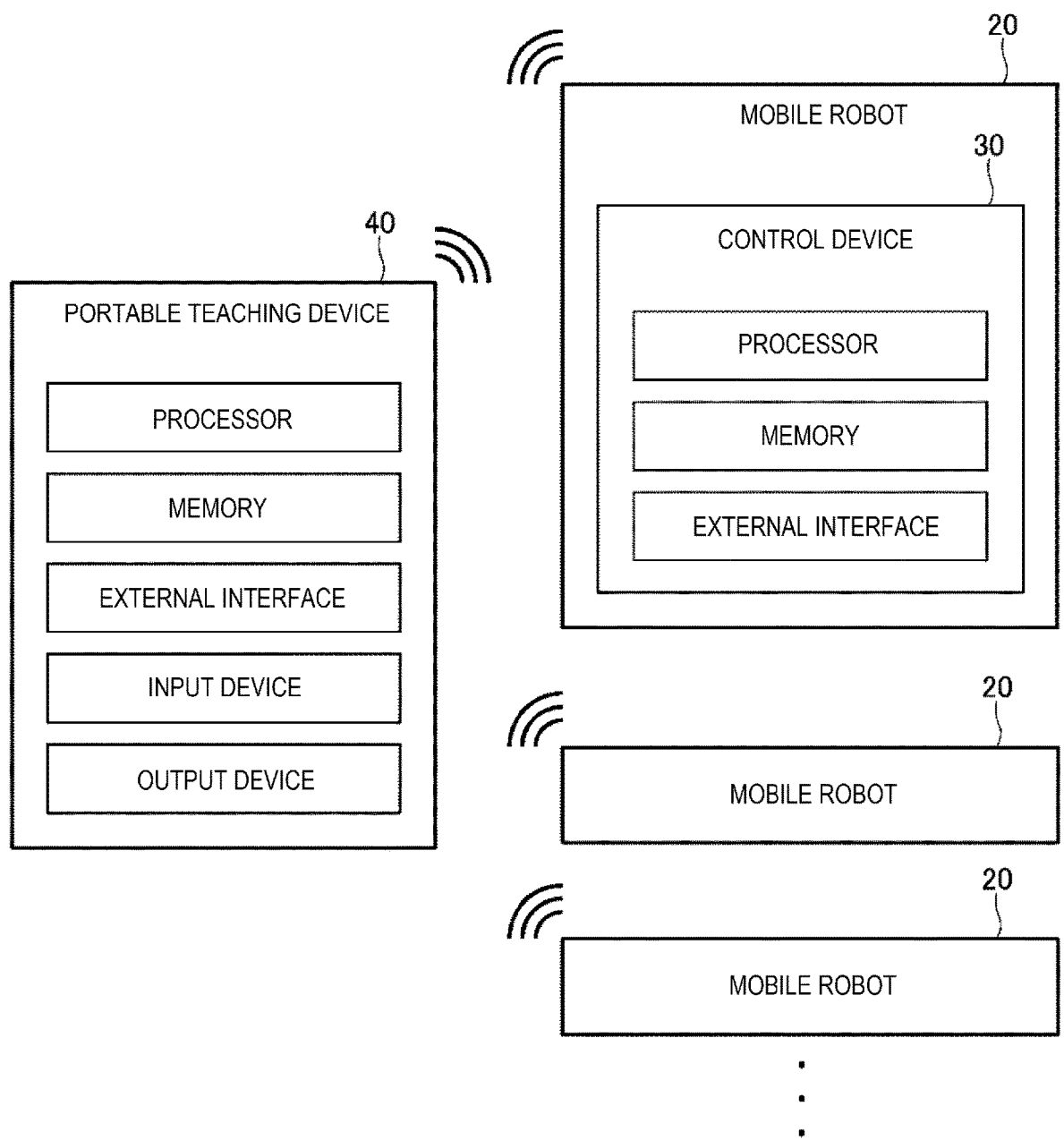
FIG. 5 is a diagram showing an example of a hardware configuration for realizing functions of sections of the robot system.

The functions of the sections of the robot system 1 explained above can be realized by, for example, a hardware configuration shown in FIG. 5.

FIG. 5 is a diagram showing an example of a hardware configuration for realizing the functions of the sections of the robot system 1.

The portable teaching device 40 shown in FIG. 5 includes a processor, a memory, an external interface, an input device, and an output device communicably coupled to one another.

Examples of the processor shown in FIG. 5 include a CPU (Central Processing Unit).

Examples of the memory shown in FIG. 5 include a volatile memory such as a RAM (Random Access Memory) and a nonvolatile memory such as a ROM (Read Only Memory). The memory is not limited to an undetachable type and may be a detachable external storage device.

Further, examples of the external interface shown in FIG. 5 include various connectors for communication. Examples of the connectors for communication include a USB (Universal Serial Bus) connector, an RS-232C connector, and a wired LAN (Local Area Network). The external interface includes a transceiver capable of performing wireless communication by various wireless communication standards such as a wireless LAN, a Bluetooth (registered trademark), and specific low-power wireless communication.

Examples of the input device shown in FIG. 5 include a keyboard and a touch panel. Examples of the output device shown in FIG. 5 include a monitor.

The portable teaching device 40 may further include other hardware components in addition to the components explained above. For example, depending on the configuration of the first detecting section 44, the portable teaching device 40 may include a wireless antenna, an RFID tag, a beacon receiver, an ultrasonic transducer, a photodiode, a laser diode, a camera, and a terrestrial magnetism sensor.

The control device 30 shown in FIG. 5 include a processor, a memory, and an external interface communicably coupled to one another.

Examples of the processor shown in FIG. 5 include a CPU.

Examples of the memory shown in FIG. 5 include a volatile memory such as a RAM and a nonvolatile memory such as a ROM. The memory is not limited to the nondetachable type and may be a detachable external storage device.

Further, examples of the external interface shown in FIG. 5 include various connectors for communication. Examples of the connectors for communication include a USB (Universal Serial Bus) connector and an RS-232C connector.

The communication section 22 shown in FIG. 2 includes a transceiver that enables wireless communication by the various wireless communication standards explained above. When the wireless communication is performed via an access point, the access point and the communication section 22 may be communicably coupled by wire.

The control device 30 may further include other hardware components in addition to the components explained above.

For example, the portable teaching device 40 may include a primary battery or a secondary battery.

Consequently, the portability is further improved. A decrease in remaining battery power may be notified using the display section 43 or the indicator lamp section 47. In this case, the portable teaching device 40 and the mobile robot 20 may be temporarily coupled by a communication line and a power line. The portable teaching device 40 and the mobile robot 20 may be coupled by a communication line and the portable teaching device 40 and another power supply may be coupled by a power line.

1.5 Operation Content of the Portable Teaching Device

Operation content of the portable teaching device 40 is explained.

1.5.1. Display of a Present Position

Figure 6:
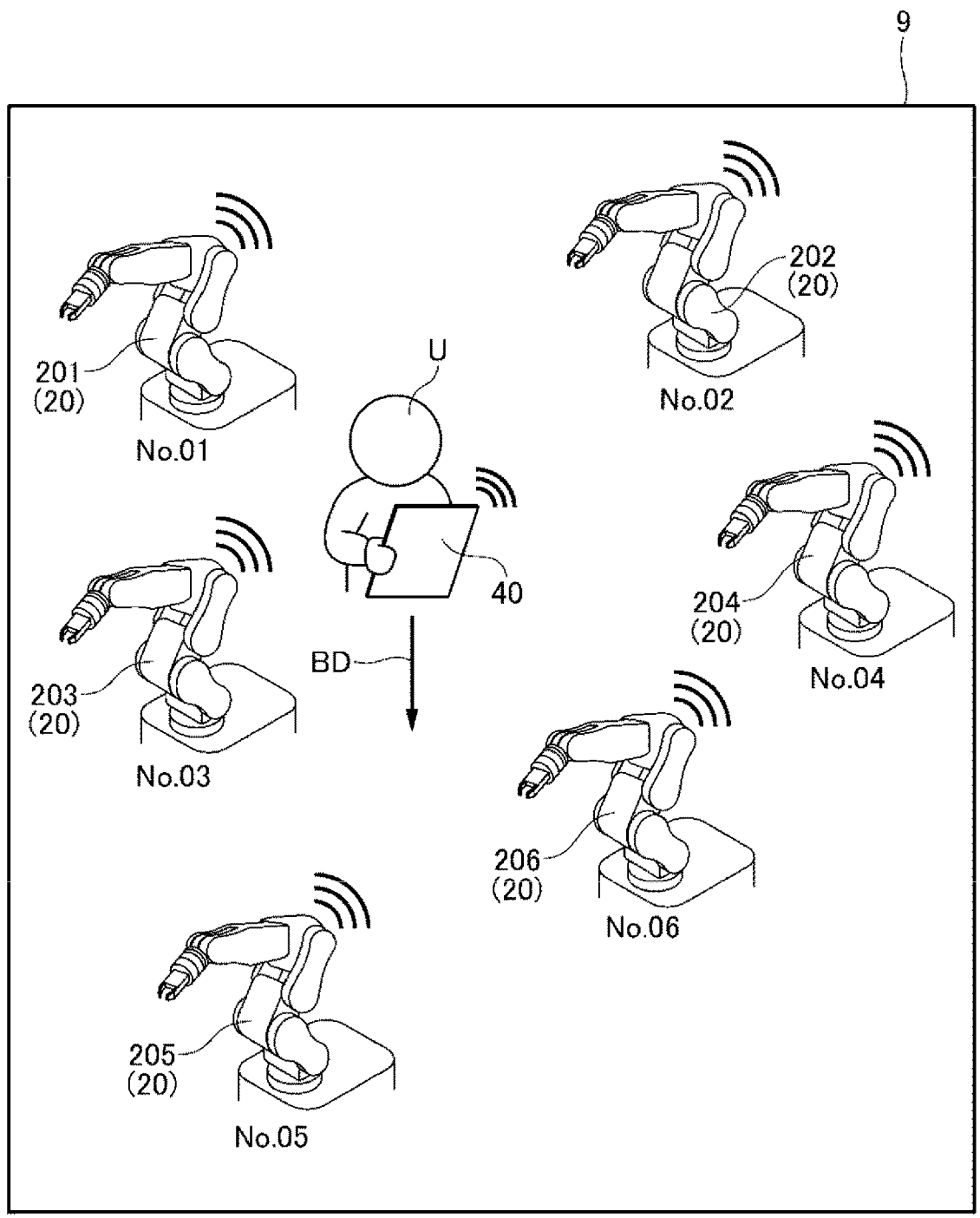
FIG. 6 is a conceptual diagram showing a disposition example of a portable teaching device and a plurality of mobile robots in order to explain operation content of the robot system according to the first embodiment.
Figure 7:
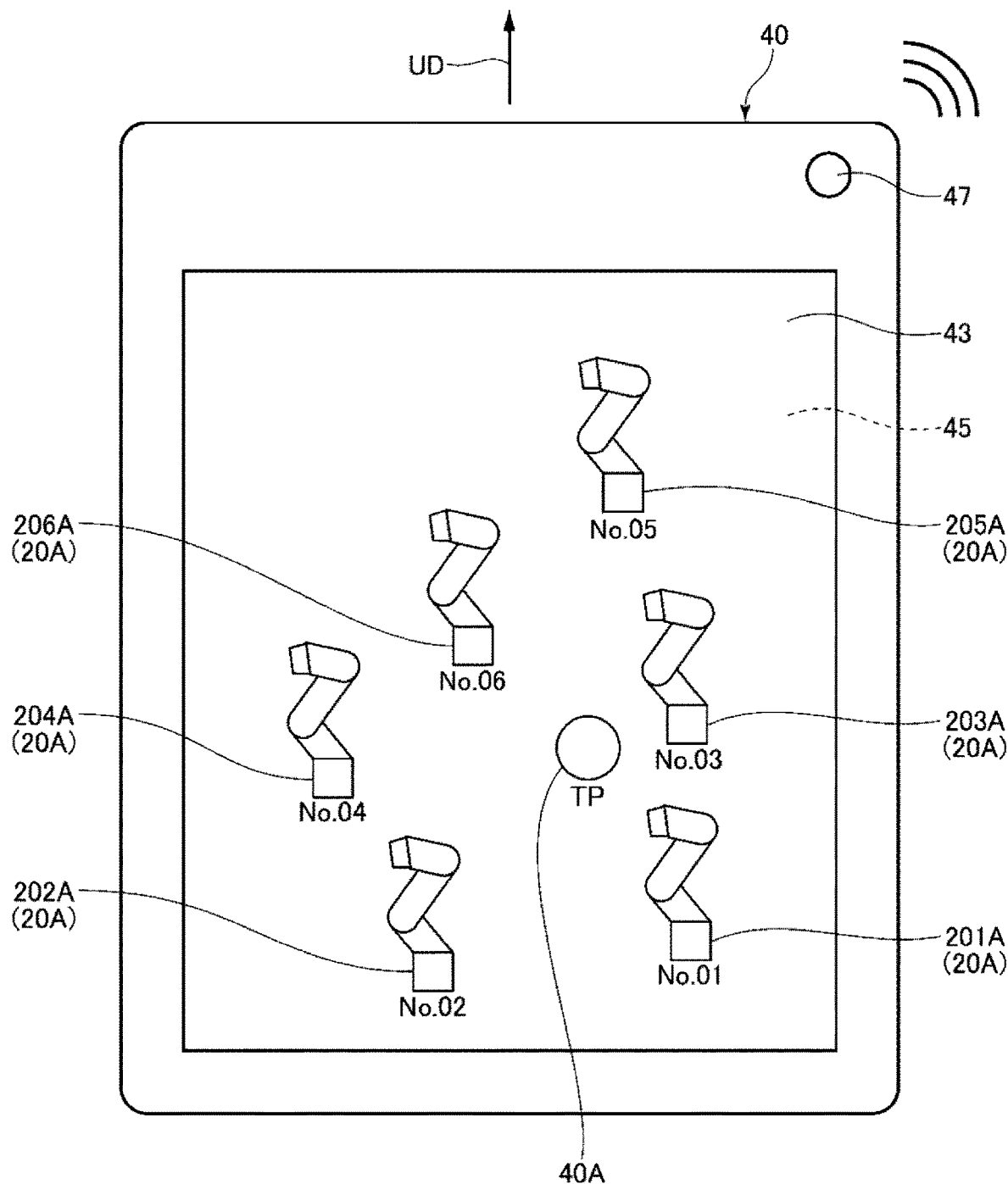
FIG. 7 is a diagram showing a display section of the portable teaching device that is displaying content corresponding to the disposition example shown in FIG. 6.

FIG. 6 is a conceptual diagram showing a disposition example of the portable teaching device 40 and the mobile robots 20 in order to explain operation content of the robot system 1 according to the first embodiment. FIG. 7 is a diagram showing the display section 43 of the portable teaching device 40 that is displaying content corresponding to the disposition example shown in FIG. 6.

The robot system 1 according to this embodiment includes, as explained above, the mobile robot 20 configured to move, the portable teaching device 40 including the display section 43 configured to display information, the portable teaching device 40 teaching the mobile robot 20, the first detecting section 44 configured to detect a present position of the portable teaching device 40, the second detecting section 70 configured to detect a present position of the mobile robot 20, and the display control section 42 configured to cause, based on a detection result of the first detecting section 44 and a detection result of the second detecting section 70, the display section 43 to display the present position of the portable teaching device 40 and the present position of the mobile robot 20.

With such a robot system 1, for example, as shown in FIG. 6, when six mobile robots 20 are set in a setting region 9, present positions of the six mobile robots 20 can be displayed on the display section 43 of the portable teaching device 40. If the portable teaching device 40 is located in the setting region 9, a present position of the portable teaching device 40 can also be displayed on the display section 43. In other words, information equivalent to a layout drawing obtained by overlooking the setting region 9 where the portable teaching device 40 and the mobile robots 20 are disposed can be displayed on the display section 43. Consequently, a user U less easily misrecognizes the mobile robot 20 on which the user U should perform teaching work. The user U can more surely perform the teaching work on the mobile robot 20.

The portable teaching device 40 according to this embodiment is a device that teaches the mobile robot 20 configured to move. The portable teaching device 40 includes the display section 43 configured to display information and the display control section 42 configured to cause, based on a detection result of the first detecting section 44 configured to detect a present position of the portable teaching device 40 and a detection result of the second detecting section 70 configured to detect a present position of the mobile robot 20, the display section 43 to display the present position of the portable teaching device 40 and the present position of the mobile robot 20.

With such a portable teaching device 40, the user U can more surely perform the teaching work on the mobile robot 20 on which the user U should perform the teaching work.

More detailed explanation follows.

In FIG. 6, the six mobile robots 20 are located to surround the user U who is holding the portable teaching device 40. At this time, present positions of the mobile robots 20 and a present position of the user U shown in FIG. 6 are displayed on the display section 43 of the portable teaching device 40. Therefore, as shown in FIG. 7, icons 20A indicating the six mobile robots 20 and an icon 40A indicating the portable teaching device 40 are displayed in disposition corresponding to the direction of the portable teaching device 40.

It is assumed that the six mobile robots 20 shown in FIG. 6 have No. 1 to No. 6 as identification signs. The mobile robots 20 corresponding to the identification signs No. 01 to No. 06 are represented as mobile robots 201 to 206. By receiving position information added with the identification signs No. 01 to No. 06 from the mobile robots 201 to 206, the portable teaching device 40 can associate the position information and the identification signs. The icons 20A corresponding to the mobile robots 201 to 206 are represented as icons 201A to 206A.

A positional relation among the icons 201A to 206A shown in FIG. 7 corresponds to a positional relation among the mobile robots 201 to 206 shown in FIG. 6. In FIG. 7, an upward direction UD in the display section 43 of the portable teaching device 40 corresponds to a direction BD in which the back of the portable teaching device 40 held by the user U faces in FIG. 6. In other words, display content of the display section 43 rotates according to the posture of the user U such that the direction BD is always the upward direction UD of the display section 43. Consequently, a line of sight direction of the user U who is gripping the portable teaching device 40 and the upward direction UD of the display section 43 coincide. As a result, the display content of the display section 43 substantially coincides with visual perception of the user U. The user U can easily intuitively associate the mobile robots 201 to 206 and the icons 201A to 206A.

With the action explained above, when the user U performs operation for selecting one icon out of the icons 201A to 206A in order to select one mobile robot out of, for example, the six mobile robots 201 to 206, a probability of erring in the selection operation is low. As a result, the user U can perform sure teaching work.

The display section 43 may display the identification signs No. 01 to No. 06 as shown in FIG. 7 in addition to the icons 201A to 206A. Consequently, the user U can identify the mobile robots 201 to 206 by visually recognizing not only the positional relation among the icons 201A to 206A but also the identification signs No. 01 to No. 06.

The positions of the icons 201A to 206A and the position of the icon 40A in the display section 43 are sequentially updated according to the present positions of the mobile robots 201 to 206 and the present position of the portable teaching device 40. Accordingly, when the mobile robots 201 to 206 move or the user U holding the portable teaching device 40 moves, the movement is reflected on display content of the display section 43 according to the movement.

Figure 8:
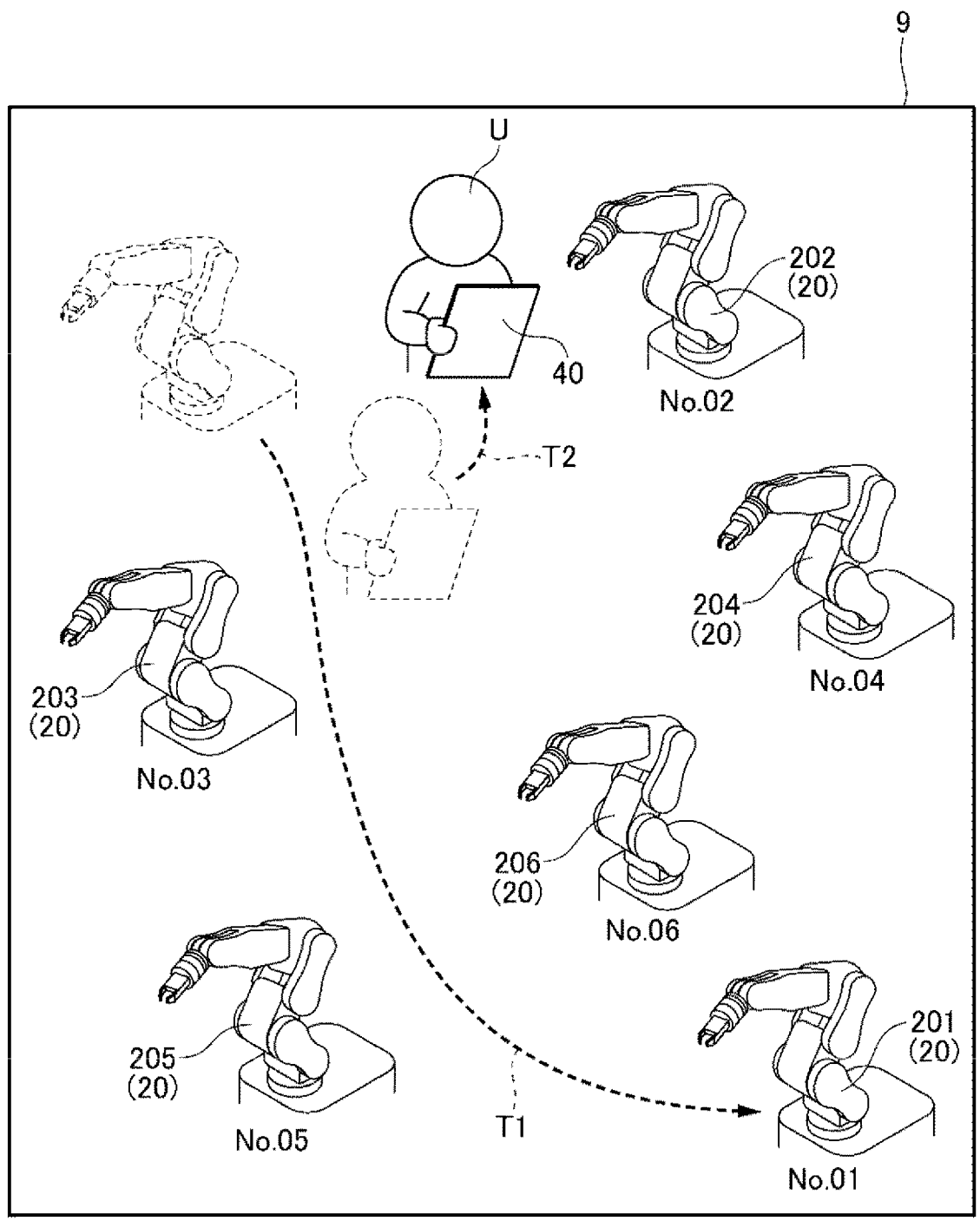
FIG. 8 is a diagram showing an example of a track of movement of one mobile robot.
Figure 9:
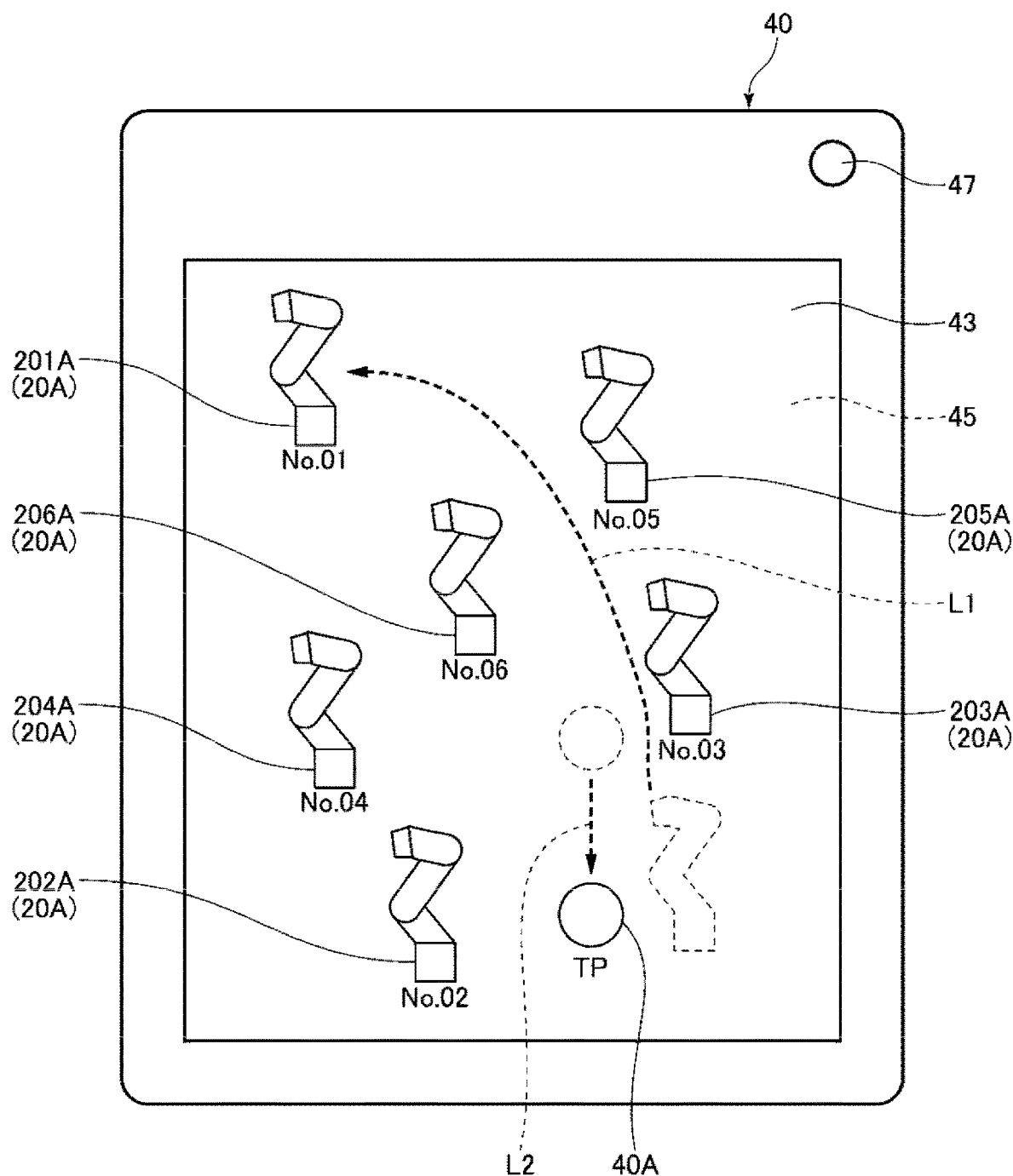
FIG. 9 is a diagram showing an example in which the track of the mobile robot shown in FIG. 8 is displayed as a line on the display section.

FIG. 8 is a diagram showing an example of a track T1 of movement of one mobile robot 201. FIG. 9 is a diagram showing an example in which the track T1 of the mobile robot 201 shown in FIG. 8 is displayed on the display section 43 as a line L1.

When the mobile robot 201 moves in a route indicated by the track T1 as shown in FIG. 8, the icon 201A corresponding to a present position of the mobile robot 201 at a moving destination and the line L1 corresponding to the track T1 are displayed in FIG. 9. Consequently, the user U can intuitively confirm whether the mobile robot 201 has moved in a predetermined route. When the portable teaching device 40 moves in a route indicated by a track T2 as shown in FIG. 8, the icon 40A corresponding to a present position of the portable teaching device 40 at a moving destination and a line L2 corresponding to the track T2 are displayed in FIG. 9. Consequently, the user U can intuitively confirm in which route the user U gripping the portable teaching device 40 has moved.

In this way, the display control section 42 of the portable teaching device 40 changes, based on a posture change of the portable teaching device 40, a display form of the icon 40A indicating the present position of the portable teaching device 40 and a display form of the icon 201A indicating the present position of the mobile robot 20. Consequently, the user U can easily match a real space and display content and more intuitively perform operation. As a result, it is less likely that the user U selects the mobile robot 20 different from the mobile robot 20 that the user U should select.

The display control section 42 of the portable teaching device 40 may have a function of causing the display section 43 to display an outside environment of the mobile robot 20.

Figure 10:
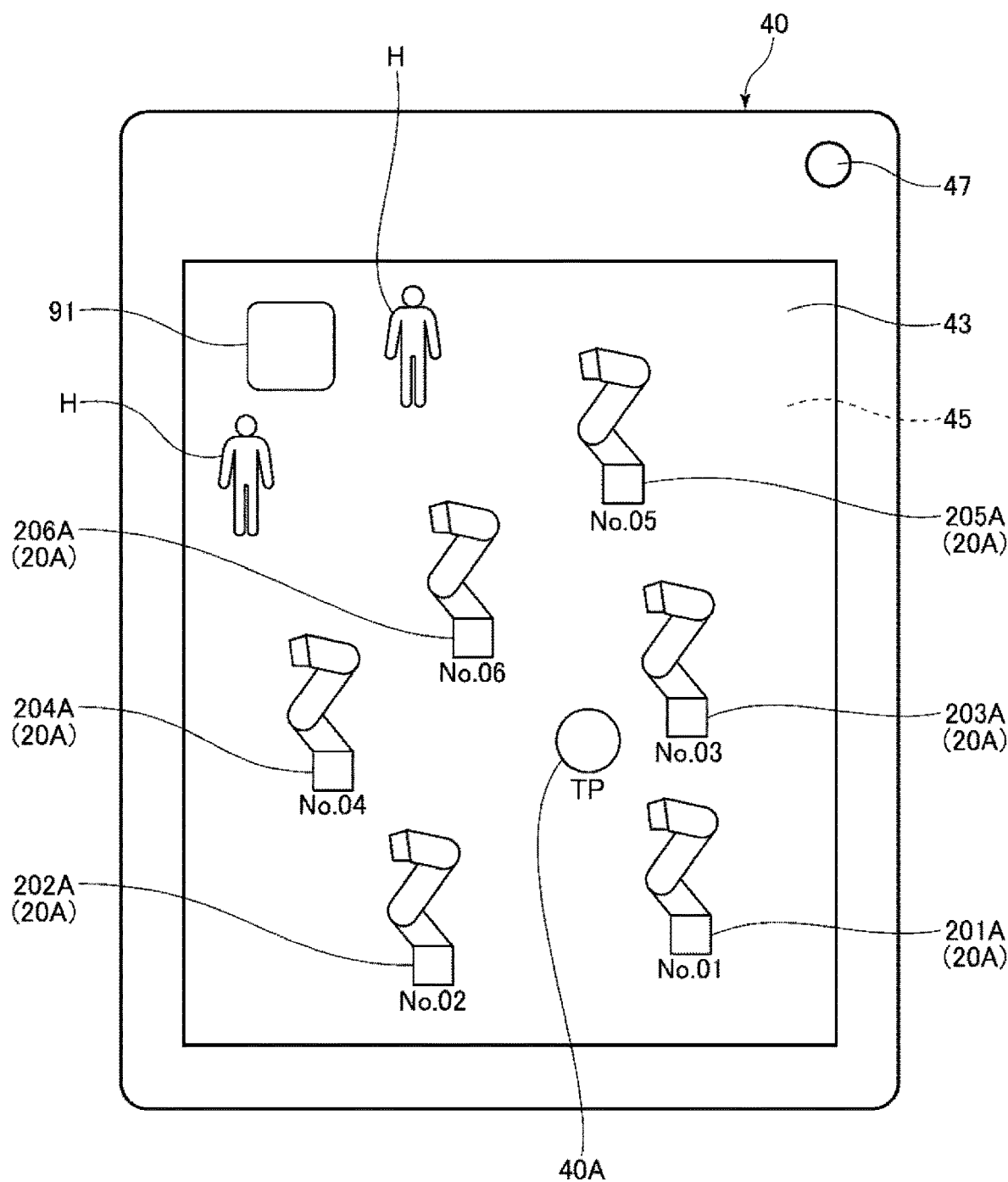
FIG. 10 is a diagram showing the display section of the portable teaching device that is displaying an outside environment of the mobile robots.

FIG. 10 is a diagram showing the display section 43 of the portable teaching device 40 that is displaying an outside environment of the mobile robot 20.

A column 91 of a building is displayed on the display section 43 shown in FIG. 10 as an example of an obstacle present around the mobile robots 20. The position and the shape of the column 91 are known. The position does not change even if the mobile robots 20 move. Accordingly, it is possible to cause the display section 43 to display information concerning an outside environment such as the column 91 by registering the information in the display control section 42 in advance.

By displaying the outside environment in this way, the user U can more accurately match space recognition in the real space and space recognition in the display section 43. In other words, the user U can intuitively specify one of the mobile robots 201 to 206 including not only the mobile robot 20 likely to always move but also a positional relation with an external environment that does not move. Accordingly, it is much less likely that the user U selects the mobile robot 20 different from the mobile robot 20 that the user U should select.

Further, when a user who uses the portable teaching device 40 is represented as the user U, as shown in FIG. 10, the display control section 42 of the portable teaching device 40 may have a function of causing the display section 43 to display a present position of a person H other than the user U as shown in FIG. 10. By causing the display section 43 to display the person H other than the user U in this way, the user U can more accurately match the space recognition in the real space and the space recognition in the display section 43. Consequently, it is much less likely that the user selects the mobile robot 20 different from the mobile robot 20 that the user should select.

The present position of the person H other than the user U can be detected by, for example, imaging an outside environment with a not-shown camera and performing image recognition processing. When the person H carries a device capable of performing wireless communication by a wireless LAN, the present position of the person H can be calculated using, for example, the positioning technique by the wireless LAN explained above.

The display control section 42 may be provided in a place other than the portable teaching device 40, for example, in the mobile robot 20 or may be independently provided in other places.

On the other hand, when responsiveness of display on the display section 43, simplification of the configuration of the robot system 1, and the like are considered, the display control section 42 is desirably provided in the portable teaching device 40. Consequently, it is possible to realize the portable teaching device 40 that is excellent in responsiveness of display and can achieve simplification of the configuration of the robot system 1.

The various icons explained above may be any images, characters, or the like. In other words, display content for displaying a present position and the like is not particularly limited. For example, as shown in FIG. 7, a character "TP" indicating the portable teaching device 40 may be written together with the icons.

1.5.2 Display of Selection Operation

Figure 11:
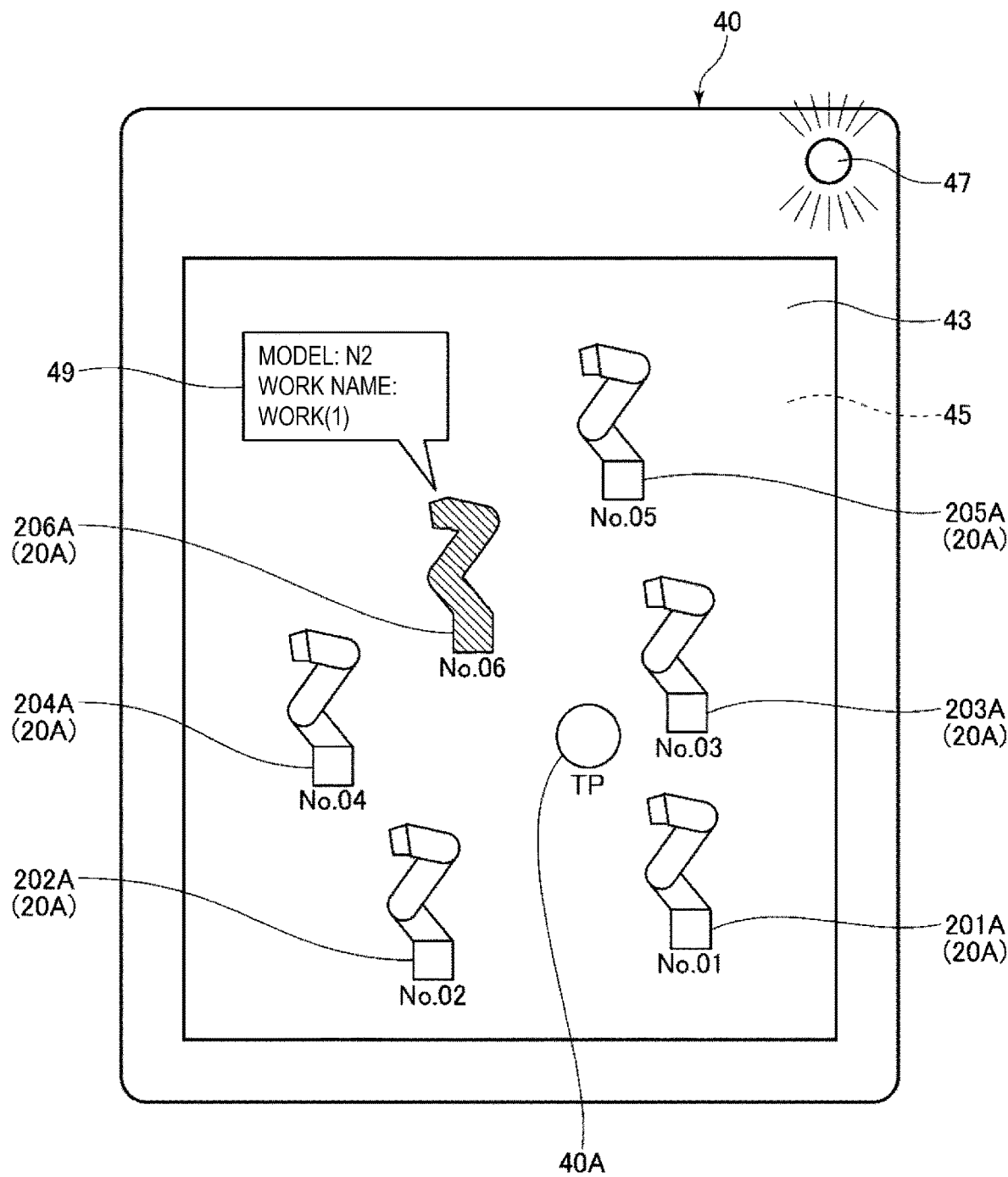
FIG. 11 is a diagram showing the display section in a state in which one mobile robot is selected out of the plurality of mobile robots.

FIG. 11 is a diagram showing the display section 43 in a state in which one mobile robot 20 is selected out of the plurality of mobile robots 20.

A state after the user U performs, on the input receiving section 45, selection operation for selecting the icon 206A is displayed on the display section 43 shown in FIG. 11. The mobile robot 206 having the identification sign No. 06 is selected by the selection operation. Wireless communication is established between the mobile robot 206 and the portable teaching device 40.

Specifically, the robot system 1 according to this embodiment includes the mobile robot 206 functioning as a first robot and the mobile robots 201 to 205 functioning as second robots. At this time, the display control section 42 causes the display section 43 to display the present position of the mobile robot 206 and the present positions of the mobile robots 201 to 205. As explained above, the portable teaching device includes the communication section 41 capable of communicating with the mobile robot 206 and the mobile robot 205 and the input receiving section 45 configured to receive selection operation for selecting the mobile robot 206. The communication section 41 establishes communication with the mobile robot 206 based on the selection operation.

Consequently, the user U can intuitively perform, based on a positional relation between a present position of the mobile robot 206 and a present position of the mobile robot 205 in the real space, selection operation for selecting the mobile robot 206. Accordingly, it is much less likely that the user U selects the mobile robot 20 different from the mobile robot 206 that the user U should select. As a result, it is possible to more surely establish communication with the mobile robot 206 that the user U should select.

The display control section 42 may have a function of, according to the selection operation, causing the display section 43 to display, in association with the present position of the mobile robot 206, information indicating that the input receiving section 45 receives the selection operation. Specifically, as shown in FIG. 11, the display control section 42 differentiates a color of the icon 206A from a color of the other icons 201A to 205A. Consequently, the user U can visually confirm whether the mobile robot 206 on which the user U is about to perform the teaching work thereafter is surely selected. As a result, it is less likely that, when the mobile robot 20 different from the mobile robot 206 that the user U should select is selected, the user U overlooks the selected mobile robot 20.

The display control section 42 may have a function of, according to establishment of communication, causing the display section 43 to display a communication state between the mobile robot 206 and the portable teaching device 40. Specifically, as shown in FIG. 11, the display control section 42 differentiates a color of the icon 206A from a color of the other icons 201A to 205A. Consequently, the user U can visually grasp that the communication with the mobile robot 206 is established. As a result, it is less likely that the user U selects the mobile robot 20 different from the mobile robot 206 that the user U should select.

An element other than the color, for example, a size, density of the color, a movement, a shape, or a pattern of the icon 206A may change. The color and the other element of the icon 206A involved in the establishment of the communication are desirably different from the color and the element of the icon 206A involved in the selection operation. Consequently, the color or the element of the icon 206A sequentially changes according to changes of situations such as the selection operation and the establishment of the communication. As a result, the user U can visually conform a present situation while distinguishing the present situation.

In addition, when the communication is established, the display control section 42 may change a lighting pattern of the indicator lamp section 47 of the portable teaching device 40. For example, when communication is established with none of the mobile robots 20, the display control section 42 may control the indicator lamp section 47 not to light. On the other hand, for example, when communication with the mobile robot 206 is established, the display control section 42 lights the indicator lamp section 47. Consequently, the user U can also visually recognize the establishment of the communication by visually recognizing the lighting of the indicator lamp section 47.

The indicator lamp sections 47 may be provided in the mobile robots 20. In that case, when the communication with the mobile robot 206 is established, the display control section 42 only has to light the indicator lamp section 47 of the portable teaching device 40 and light the indicator lamp section 47 provided in the mobile robot 206. Consequently, the user U can also grasp the establishment of the communication by viewing the mobile robot 206 itself. In that case, it is desirable to light the indicator lamps 47 in the same color.

The display control section 42 may have a function of, when the communication with the mobile robot 206 is established, causing the display section 43 to display present work content 49 of the mobile robot 206. Specifically, as shown in FIG. 11, the display section 43 displays, in association with the icon 206A, the work content 49 currently performed by the mobile robot 206. Consequently, the user U can grasp the work content 49 of the selected mobile robot 206. The display section 43 may display various kinds of information other than the work content 49. By displaying these kinds of information, in teaching work that the user U performs thereafter, these kinds of information can be reflected on the teaching work. Since the teaching work is based on content of the information, it is less likely that the user U performs teaching operation on the mobile robot 20 different from the mobile robot 20 that the user U should select. Examples of the information other than the work content 49 include all kinds of information concerning the mobile robot 206, for example, model names of the mobile robots 20.

After the communication is established, a communication state is sometimes deteriorated by some cause. In the case of the wireless communication, the communication state is deteriorated when radio wave intensity decreases because of, for example, a communication distance or presence or absence of an obstacle. In the case of the wired communication, the communication state is deteriorated when damage or the like occurs in the communication line. When such a state occurs, it is requested to quickly inform the user U. Consequently, it is possible to immediately cope with the mobile robot 206 that has established the communication. It is possible to improve safety and the like.

Figure 12:
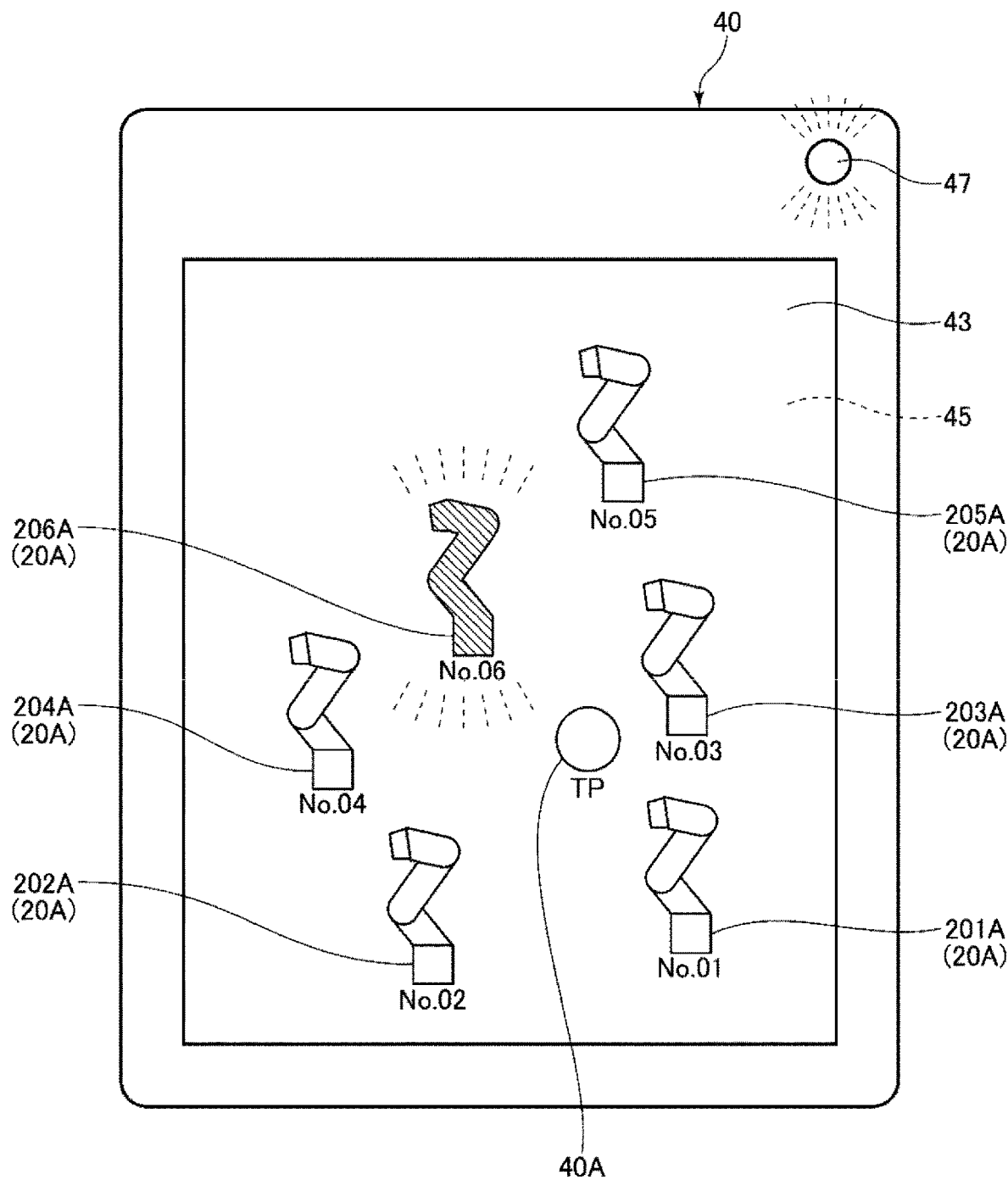
FIG. 12 is a diagram showing the display section representing a communication state between the mobile robot and the portable teaching device.

FIG. 12 is a diagram showing the display section 43 representing a communication state between the mobile robot 206 and the portable teaching device 40.

In FIG. 12, a state in which the communication state is deteriorated by some cause after the communication between the mobile robot 206 and the portable teaching device 40 is established as shown in FIG. 11 is displayed. Specifically, the display control section 42 flashes the icon 206A. Consequently, the user U can visually grasp that the communication state with the mobile robot 206 is deteriorated. Other than the flashing of the icon 206A, a display method may be a change of, for example, a size, density of a color, a movement, a shape, or a pattern of the icon 206A.

In addition, when the communication state is deteriorated, the display control section 42 may change a lighting pattern of the indicator lamp section 47 of the portable teaching device 40. For example, when a communication state of the mobile robot 206 is deteriorated, the display control section 42 flashes the indicator lamp section 47. Consequently, the user U can also visually grasp the deterioration of the communication state by visually recognizing the flashing of the indicator lamp section 47.

When the indicator lamp sections 47 are also provided in the mobile robots 20, for example, when the communication state with the mobile robot 206 is deteriorated, the display control section 42 only has to flash the indicator lamp section 47 of the portable teaching device 40 and also flash the indicator lamp section 47 provided in the mobile robot 206. Consequently, the user U can also grasp the deterioration of the communication state by viewing the mobile robot 206 itself.

When the communication with the mobile robot 206 is established, the portable teaching device 40 may output a signal for stopping the movement of the mobile robot 206. Consequently, the movement of the mobile robot 206 can be stopped by the robot control section 31. As a result, when the teaching work is performed after the communication is established, it is possible to prevent a deficiency due to the movement of the mobile robot 206, for example, prevent deterioration of a communication state. It is possible to stably perform the teaching work.

In this case, the input receiving section 45 of the portable teaching device 40 may receive input operation about which of two stop modes is selected as a stop mode for stopping the movement of the mobile robot 20. Specifically, when the communication section 22 establishes communication with the mobile robot 206 functioning as the first robot, the input receiving section 45 may receive operation for selecting a first stop mode for stopping the movement of the mobile robot 206 and not stopping movement of the mobile robots 201 to 205 functioning as the second robots or a second stop mode for stopping the movement of both of the mobile robot 206 and the mobile robots 201 to 205, that is, all the mobile robots 201 to 206.

By enabling the stop modes to be selected in this way, it is possible to surely carry out the teaching work on the mobile robot 206 without substantially deteriorating productivity of the work of the entire robot system 1.

Other than the two stop modes, a mode for not stopping the movement of the mobile robots 20 may be included. In this case, although it is unlikely that productivity of work is deteriorated, the selection operation and the teaching work are likely to be difficult.

The display control section 42 may have a function of, when the input receiving section 45 receives selection operation for selecting the mobile robot 201 functioning as the first robot, reading out a planned moving track of the mobile robot 201 acquired by the route acquiring section 33 and causing the display section 43 to display the moving track.

Figure 13:
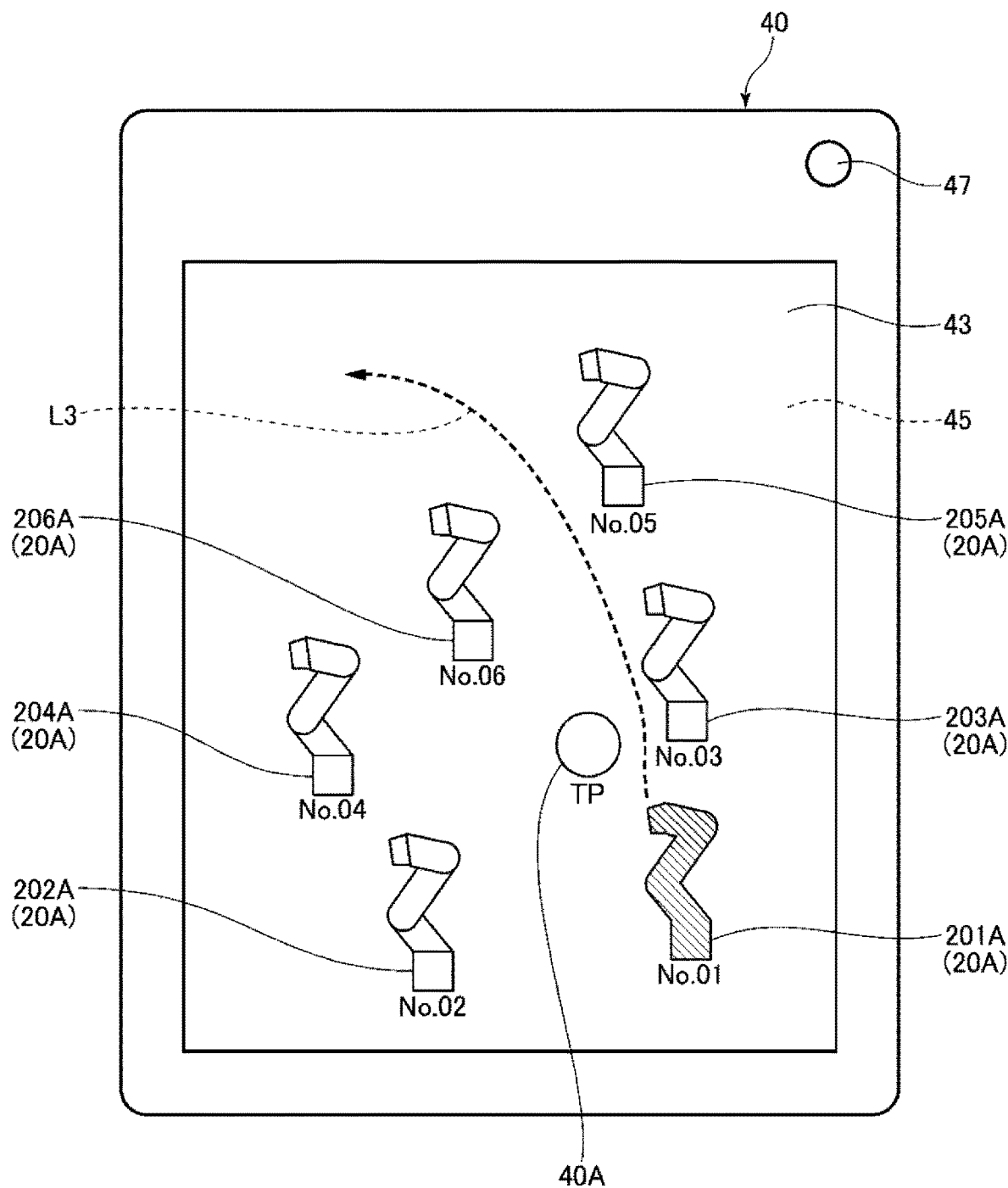
FIG. 13 is a diagram showing the display section that is displaying a planned moving track of the mobile robot.

FIG. 13 is a diagram showing the display section 43 that is displaying the planned moving track of the mobile robot 201.

As shown in FIG. 13, a planned moving track in future of the mobile robot 201 is displayed on the display section 43 as a line L3. By displaying such a line L3, the user U can intuitively grasp a moving destination of the mobile robot 201. Consequently, since teaching work adapted to the moving destination can be performed, it is possible to achieve efficiency of the teaching work.

About the mobile robots 202 to 206 other than the mobile robot 201 selected by the selection operation, moving tracks may be displayed on the display section 43 as lines.

2. Second Embodiment

A second embodiment is explained.

Figure 14:
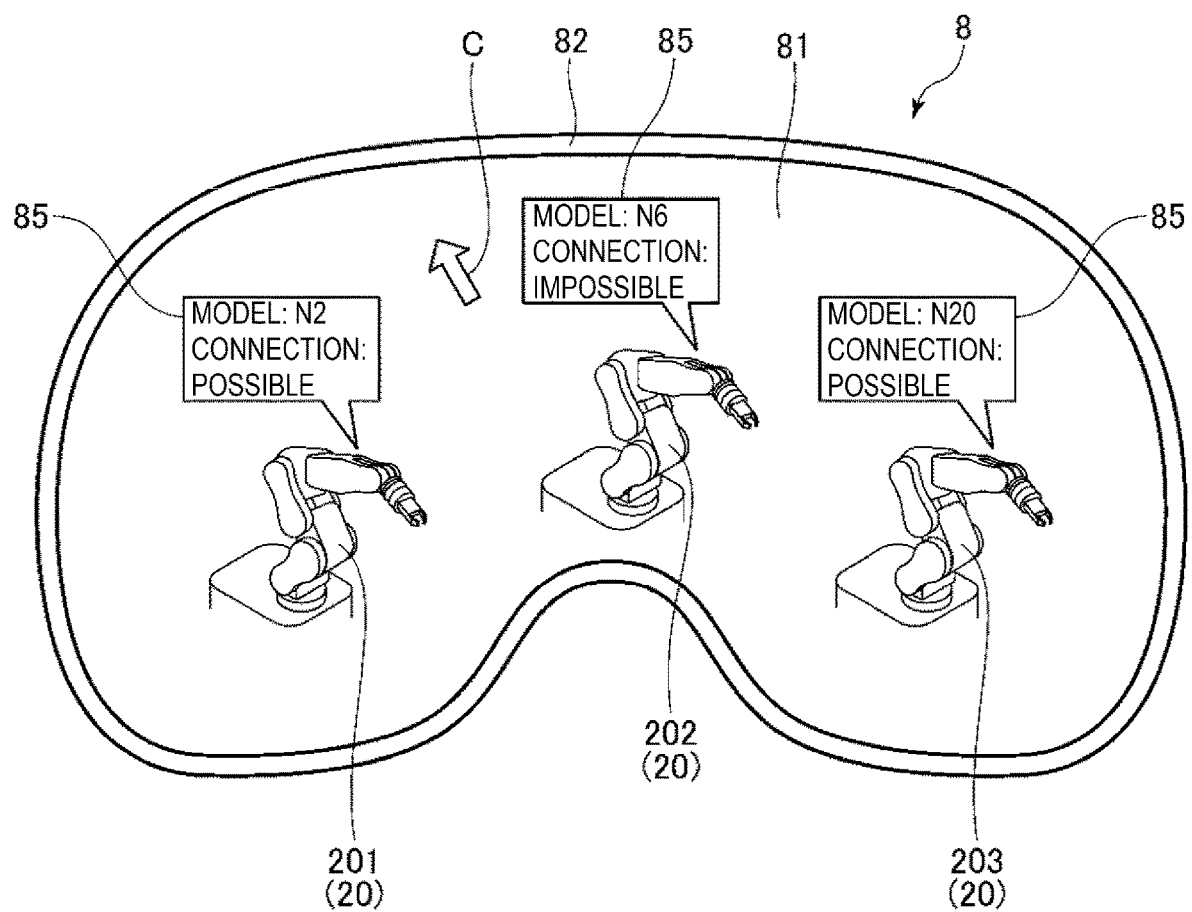
FIG. 14 is a conceptual diagram showing a robot system according to a second embodiment.

FIG. 14 is a conceptual diagram showing a robot system according to the second embodiment.

The second embodiment is explained below. In the following explanation, differences from the first embodiment is mainly explained. Explanation of similarities to the first embodiment is omitted. In FIG. 14, the same components as the components in the first embodiment are denoted by the same reference numerals and signs.

The robot system 1 according to the second embodiment is communicably coupled to the portable teaching device 40 and includes a head mounted display 8 separately from the display section 43. In other words, the head mounted display 8 is used for the purpose of supporting information display by the display section 43.

The head mounted display 8 shown in FIG. 14 includes a lens 81 configured to transmit a real image of the mobile robots 20, a frame 82 configured to support the lens 81, and a not-shown projecting section configured to project display content 85 on the lens 81. The lens 81 is a half mirror and can cause a user wearing the head mounted display 8 to visually recognize the real image. The lens 81 can display the display content 85 projected on the lens 81 to be superimposed on the real image. Accordingly, the real image of the mobile robots 20 and the display content 85 can be superimposed and can be visually associated. Consequently, the user can easily associate the mobile robots 20 and information incidental to the mobile robots 20. It is possible to improve efficiency of causing the user to grasp a situation. In other words, it is possible to facilitate understanding of the user using the technique of augmented reality.

Specifically, in FIG. 14, a state in which a real image of the mobile robots 201 to 203 is seen via the lens 81 is shown. The display content 85 corresponding to the mobile robots 201 to 203 is displayed as, for example, character information to be superimposed on the real image. Examples of the display content 85 include, besides characters, an image and a moving image. Examples of the character information include all kinds of information concerning the mobile robots 201 to 203 such as a model name, possibility of connection, and a name of work being executed.

Besides, a cursor C used for input operation to the input receiving section 45 may be displayed in the display content 85. The cursor C shown in FIG. 14 can be moved by movement operation in a not-shown input device such as a slide pad provided in the portable teaching device 40. At the same time, information pointed by the cursor C can be selected by selection operation in the input device. Accordingly, for example, by performing the selection operation in a state adapted to the real image of the mobile robot 201, as in the first embodiment, it is possible to establish communication between the mobile robot 201 and the portable teaching device 40.

As explained above, the robot system 1 according to this embodiment further includes the head mounted display 8. The display control section 42 may display, with the augmented reality technique, information on the head mounted display 8 to be superimposed on a real image of the mobile robot 20 functioning as the first robot.

With such a robot system 1, by using the augmented reality technique, the user can perform the selection operation while directly visually recognizing a real image of the mobile robots 20 in the real space. Moreover, since various kinds of information can also be displayed to be adjacent to the real image, misunderstanding of the real image less easily occurs. Consequently, it is much less likely that the user U selects the mobile robot 20 different from the mobile robot 20 that the user U should select.

In the second embodiment explained above, the same effects as the effects in the first embodiment are obtained.

Unlike the above explanation, the head mounted display 8 may be used as a display section substituting the display section 43. In that case, an icon or the like indicating a present position of the portable teaching device 40 only has to be displayed together with the real image and the display content 85. The display content 85 only has to be displayed respectively in positions indicating the present positions of the mobile robots 20. With such specifications, the head mounted display 8 can substitute the display section 43. In that case, the lens 81 may not be the half mirror. The head mounted display 8 may be used as a non-transmission-type image display device. Further, in that case, a main body of the portable teaching device 40 and the head mounted display 8, which is a display section, only have to be coupled via a cable or the like. An input device such as a slide pad only has to be provided in the main body.

A wearable display such as a wristwatch-type display may be used instead of the head mounted display 8.

The robot system and the portable teaching device according to the present disclosure are explained above based on the embodiments shown in the figures. However, the present disclosure is not limited to this. The components of the sections can be replaced with any components having the same functions. Any other components may be added to the robot systems and the portable teaching devices in the embodiments.

What is claimed is:

1. A robot system comprising:
   a mobile robot configured to move, the mobile robot having a first inertial sensor;
   a portable teaching device including a display and a second inertial sensor, the display being configured to display information, the portable teaching device teaching the mobile robot;
   a first camera configured to capture a first image of a first marker disposed in an outside environment of the mobile robot;
   a second camera configured to capture a second image of a second marker disposed in an outside environment of the portable teaching device;
   a memory configured to store a program; and
   a processor configured to execute the program so as to:
   cause the first camera to capture the first image;
   cause the second camera to capture the second image;
   detect a first present position of the mobile robot by comparing a location of the first marker in the captured first image and a first reference position of the mobile robot and by calculating a distance and a direction from the first reference position to the mobile robot based on a signal from the first inertial sensor;
   detect a second present position of the portable teaching device by comparing a location of the second marker in the captured second image and a second reference position of the portable teaching device and by calculating a distance and a direction from the second reference position to the portable teaching device based on a signal from the second inertial sensor; and
   display the detected first present position of the mobile robot and the detected second present position of the portable teaching device on the display.

2. The robot system according to claim 1, wherein the mobile robot is an autonomous mobile robot.

3. The robot system according to claim 2, wherein the mobile robot and the portable teaching device are coupled by wireless communication.

4. The robot system according to claim 1, wherein the processor is further configured to display a communication state between the mobile robot and the portable teaching device on the display.

5. The robot system according to claim 1, wherein the processor is further configured to change, based on a posture change of the portable teaching device, a display form of the detected second present position of the portable teaching device and the detected first present position of the mobile robot.

6. The robot system according to claim 1, wherein the processor is further configured to display present work content of the mobile robot on the display.

7. The robot system according to claim 1, wherein, when a person using the portable teaching device is represented as a user, the processor is further configured to display a present position of another person other than the user on the display.

8. The robot system according to claim 1, wherein
   the robot system includes a first robot and a second robot as the mobile robot,
   the processor is further configured to display a present position of the first robot and a present position of the second robot on the display,
   the portable teaching device includes:
   a communication interface configured to communicate with the first robot and the second robot, and
   an input interface configured to receive selection operation for selecting the first robot, and
   the communication interface is configured to establish communication with the first robot based on the selection operation.

9. The robot system according to claim 8 wherein, when the communication interface establishes the communication with the first robot, the input interface receives operation for selecting a first stop mode for stopping movement of the first robot and not stopping movement of the second robot or a second stop mode for stopping the movement of the first robot and the movement of the second robot.

10. The robot system according to claim 8, wherein the processor is further configured to display, in association with the present position of the first robot, information indicating that the input interface receives the selection operation.

11. The robot system according to claim 10, further comprising a head mounted display, wherein
   the processor is further configured to cause the head mounted display to display, with an augmented reality technique, the information to be superimposed on a real image of the first robot.

12. The robot system according to claim 8, wherein, when the input interface receives the selection operation, the processor is configured to read out a planned moving track of the first robot to display the moving track on the display.

13. The robot system according to claim 1, wherein the processor is provided in the portable teaching device.

14. A portable teaching device that teaches a mobile robot configured to move and having a first inertial sensor, the portable teaching device comprising:
   a display configured to display information;
   a second sensor;
   a processor configured to execute a program stored in a memory so as to:
   cause a first camera to capture a first image of a first marker disposed in an outside environment of the mobile robot;

cause a second image camera to capture a second image of a second marker disposed in an outside environment of the portable teaching device;

detect a first present position of the mobile robot by comparing a location of the first marker in the captured first image and a first reference position of the mobile robot and by calculating a distance and a direction from the first reference position to the mobile robot based on a signal from the first inertial sensor;

detect a second present position of the portable teaching device by comparing a location of the second marker in the captured second image and a second reference position of the portable teaching device and by calculating a distance and a direction from the second reference position to the portable teaching device based on a signal from the second inertial sensor; and display the detected first present position of the mobile robot and the detected second present position of the portable teaching device on the display.

15. The portable teaching device according to claim 14, wherein the processor is further configured to display a communication state between the mobile robot and the portable teaching device on the display.

16. The portable teaching device according to claim 14, wherein the processor is further configured to change, based on a posture change of the portable teaching device, a display form of the detected second present position of the portable teaching device and the detected first present position of the mobile robot.

17. The portable teaching device according to claim 14, wherein the processor is further configured to display present work content of the mobile robot on the display.

18. The portable teaching device according to claim 14, wherein, when a person using the portable teaching device is represented as a user, the processor is further configured to display a present position of another person other than the user on the display.

* * * * *